United States Patent
Rich et al.

(10) Patent No.: US 6,934,840 B2
(45) Date of Patent: Aug. 23, 2005

(54) COMPOSITE KEYSTORE FACILITY APPARATUS AND METHOD THEREFOR

(75) Inventors: Bruce Arland Rich, Round Rock, TX (US); Julianne Yarsa, Austin, TX (US); Theodore Jack London Shrader, Austin, TX (US); Donna Skibbie, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 864 days.

(21) Appl. No.: 09/746,582

(22) Filed: Dec. 21, 2000

(65) Prior Publication Data

US 2002/0080975 A1 Jun. 27, 2002

(51) Int. Cl.$^7$ .................................................. H04L 9/00
(52) U.S. Cl. ........................ 713/156; 713/173; 380/277
(58) Field of Search ........................ 380/277, 30, 278, 380/279; 713/156, 168, 175, 189, 193, 173, 150, 200, 201, 155, 157, 158, 170; 707/1, 10, 100–200, 104.1, 203, 201, 202; 711/129, 153; 715/533

(56) References Cited

U.S. PATENT DOCUMENTS

| | | | | |
|---|---|---|---|---|
| 5,212,788 A | * | 5/1993 | Lomet et al. ................ 707/201 |
| 5,551,027 A | * | 8/1996 | Choy et al. ................... 707/201 |
| 5,568,554 A | * | 10/1996 | Eastlake, 3rd ............... 713/181 |
| 5,717,759 A | | 2/1998 | Micali .......................... 380/25 |
| 5,745,574 A | | 4/1998 | Muftic ......................... 380/23 |
| 5,774,552 A | | 6/1998 | Grimmer ...................... 380/25 |
| 5,841,865 A | | 11/1998 | Sudia ........................... 380/21 |
| 5,842,207 A | * | 11/1998 | Fujiwara et al. ............... 707/7 |
| 5,899,998 A | * | 5/1999 | McGauley et al. ....... 707/104.1 |
| 5,960,194 A | * | 9/1999 | Choy et al. .................. 707/102 |
| 6,049,872 A | * | 4/2000 | Reiter et al. ................. 713/157 |
| 6,345,288 B1 | * | 2/2002 | Reed et al. .................. 709/201 |
| 6,418,467 B1 | * | 7/2002 | Schweitzer et al. ......... 709/223 |
| 6,529,953 B1 | * | 3/2003 | Van Renesse ............... 709/223 |
| 6,584,475 B1 | * | 6/2003 | Carey et al. ................. 707/203 |

* cited by examiner

*Primary Examiner*—Hosuk Song
(74) *Attorney, Agent, or Firm*—Catherine K. Kinslow; Barry S. Newberger; Jeffrey S. LaBaw (57) ABSTRACT

An apparatus and method for managing keystores is implemented. A distributed keystore is established by aggregating individual. The distributed keystore may, be organized in a multi-level structure, which may be associated with an organizational structure of an enterprise, or other predetermined partitioning. Additionally, a centralized management of certificates may be provided, whereby the expiration or revocation of the certificates may be tracked, and expired or revoked certificates may be refreshed. The keystore may be updated in response to one or more update events.

36 Claims, 5 Drawing Sheets

COMPOSITE KEYSTORE FACILITY APPARATUS AND METHOD THEREFOR

TECHNICAL FIELD

The present invention relates in general to data processing systems, and in particular, to the management of databases of cipher keys for protecting sensitive transactions in the data processing system.

BACKGROUND INFORMATION

Transactions between data processing systems that require the transfer of sensitive information are ubiquitous in the modem data processing environment. For example, such transactions may include electronic commerce retail transactions by individuals and businesses via the Internet, electronic funds transfers between financial institutions, or the communication of proprietary information between multiple installations of an enterprise. Protection of the sensitive information may be implemented by encrypting, or enciphering, the sensitive information, thereby shielding the sensitive information from unauthorized access. Modem cryptographic schemes rely on encryption algorithms that are publicly known, and rely on a secret encryption key (hereinafter simply "key"). See e.g., BRUCE SCHNEIER APPLIED CRYPTOGRAPHY SECOND EDITION 31–32 (1997). Enciphering an information set to be protected entails mathematically combining a key and the data constituting the information to be protected in accordance with the encryption algorithm. See e.g. Id. at 4–5. The recipient of the data recovers the information (the so-called plaintext) by mathematically combining a decryption key with the enciphered data. See e.g. Id. So-called symmetric encryption algorithms use the same key for enciphering the plaintext to generate the encrypted data and for decrypting the enciphered data to recover the plaintext. See e.g. Id. Asymmetric key encryption algorithm, which may also be referred to as public key algorithms, encipher the data to be protected with a first key, called the public key, and recover the plaintext with a second key, referred to as the private key. See e.g. Id.

Figure 1A:
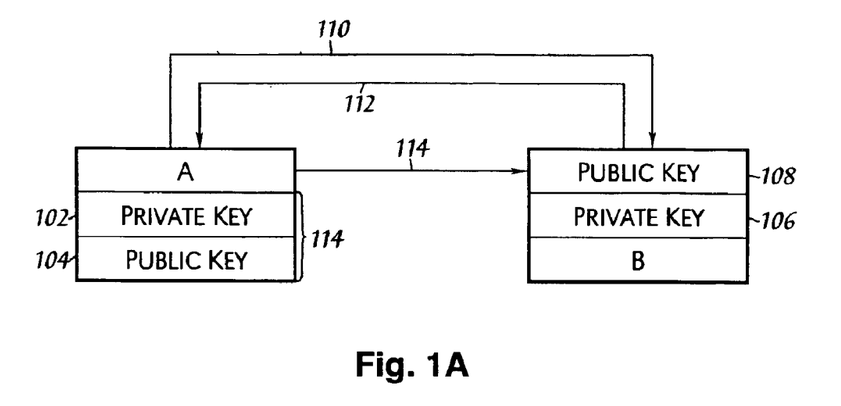
FIG. 1A schematically illustrates an encryption key exchange which may be used in an embodiment of the present invention.

Referring to FIG. 1, there is illustrated therein a schematic transaction between two users, A and B, illustrating the operation of a public key encryption scheme for protecting the sensitive information in the transaction. Note that one or both of users A and B need not be human users, users may also refer to data processing systems automatically implementing the transaction without human intervention. For example, a data processing system in a main office of a financial institution may automatically gather financial records from branch institutions at the close of business, without human intervention, and for security purposes, the transfer of such information maybe protected by enciphering the data. Similarly, in electronics funds transferred between financial institutions, which need not necessarily be branches of the same enterprise, may similarly be effected. Suppose, for example, in FIG. 1, user A needs to communicate sensitive information to user B. Encryption of the data is to be performed using a public key encryption algorithm, which is known to both user A and user B. Such algorithms are known in the data processing art. See e.g. Id at 466–67; 513–14 (discussing the RSA and Diffie-Hellman algorithms.) Each user has an associated private key (user A's, 102 and user B's 106) and a public key (user A's 104 and user B's 108). In accordance with the principles of public key cryptosystems, user A issues a request 110 to user B (as would be understood by an artisan of ordinary skill in the art, the data processing system associated with user A issues a request of the data processing system associated with user B) for user B's public key 108. User B sends a reply 112 to user A containing user B's public key 108. User A encrypts user A's message with user B's public key 108 and sends the encrypted message 114 to user B. User B then decrypts the message 114 using user B's private key 106 which is known only to user B. Note that user A's encrypted message 114 cannot be decrypted using B's public key. (FIG. 1 is meant to be illustrative of public key systems. More typically the public key algorithm is used to encrypt a secret symmetric key which is used with a corresponding symmetric key algorithm to encrypt the message, and the ciphertext and encrypted secret key are both sent to the recipient who first decrypts the secret key and uses it to recover the plaintext.)

Figure 1B:
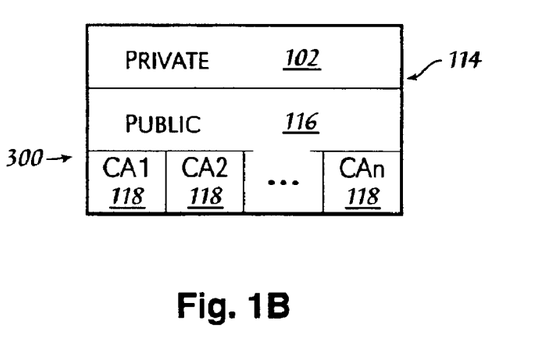
FIG. 1B schematically illustrates a keystore structure which may be used in an embodiment of the present invention.

However, user A cannot, without more, be certain that user B's public key reply message 112 has not been compromised in flight where, for example, a third-party substitutes its public key for user B's public key and not the public key of another. In other words, user A, without more, cannot be certain that the public key message 112 that it receives actually contains user B's public key. To authenticate user B's public key, the public key may be digitally signed by a party trusted by user A. (Authentication using digital signing is discussed, for example, in BRUCE SCHNEIER, APPLIED CRYPTOGRAPHY SECOND EDITION 34–41 (1997).) For the purposes herein, a file or data structure including a public key and associated digital signature (and possibly other information as discussed further below) may be referred to as a certificate. Trusted parties signing certificates may be referred to as certificate authorities (CAs)(Authentication of certificates may be provided by third-party commercial CAs. One such CA is Verisign). Thus, each user, such as user A and B in FIG. 1 maintain a database (often referred to as a keystore) of certificates which includes a certificate associated with the users' respective public key, as well as certificates associated with one or more certificate authorities, which, as will be discussed further herein below, may be necessary to create a "chain of authorities." Typically, security enabled applications, web browsers, for example, usually include a keystore that includes certificates associated with one or more certificate authorities that are trusted parties of the provider of the web browser, or other application. Consequently, to accommodate authenticated key exchange, each user maintains a keystore 114 that includes a set of certificates needed recognize and resolve (or possibly, to generate) a chain of authorities. Such a keystore is schematically illustrated in FIG. 1B. In addition to the private key information 102, a portion of the keystore 116 contains the public information which includes a set of n of certificates 118, labeled CA1, CA2, CAn. Consequently, each user, maintains a set, or database of keystores associated with each security enabled application in the user's data processing system. This can create a significant administrative workload to maintain each user's keystore. For example, certificates may have a finite life time, and one or more certificates may expire without the user's knowledge, and additionally, individual users may not have the expertise necessary to update expired certificates. As a consequence, a chain of authentication may be broken, and the user unable to effect secure communications. Thus, there is a need in the art for apparatus and methods to centralize the management of certificate databases.

SUMMARY OF THE INVENTION

The aforementioned needs are addressed by the present invention. Accordingly, there is provided, in a first form, a keystore method. The method includes retrieving one or more certificates from a local database. It is determined if said any of said one or more certificates preexists in a preselected portion of a distributed database, and nonpreexisting certificates of said one or more certificates are stored in the preselected portion of the distributed database.

There is also provided, in a second form, a computer program product in a tangible storage medium. The program product includes a program of instructions for performing the process of retrieving one or more certificates from a first local database. The instructions further determine if the any of the one or more certificates preexists in a preselected portion of a distributed database, and store nonpreexisting certificates of the one or more certificates in the preselected portion of the distributed database.

Additionally, there is provided, in a third form, a data processing system. The system contains circuitry operable for retrieving one or more certificates from a first local database. Also included is circuitry operable for determining if the any of the one or more certificates preexists in a preselected portion of a distributed database, and circuitry operable for storing nonpreexisting certificates of the one or more certificates in the preselected portion of the distributed database.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention provides a system and method for aggregating public, non-personal authenticated encryption keys (contained in certificates, which may be X.509 certificates, described further herein below) in a database (which may be referred to as a keystore). The certificates may include certificates for individual users, root certificates for certificate authorities (CAs) and additional certificates, which may be required to generate a chain of authorities. The aggregated keystore may be a hierarchical or multilevel keystore, which may be associated with an organizational structure of an enterprise. A first-level or "local" keystore may include personal certificates and one or more higher-level, or "organizational" keystores may include root certificates for CAs considered trusted by the enterprise or corresponding organization. Additionally, a centralized management of certificates may be provided, whereby for example, the expiration or revocation of the certificates may be tracked, and expired or revoked certificates may be refreshed.

In the following description, numerous specific details are set forth such as specific application program interfaces (APIs) to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
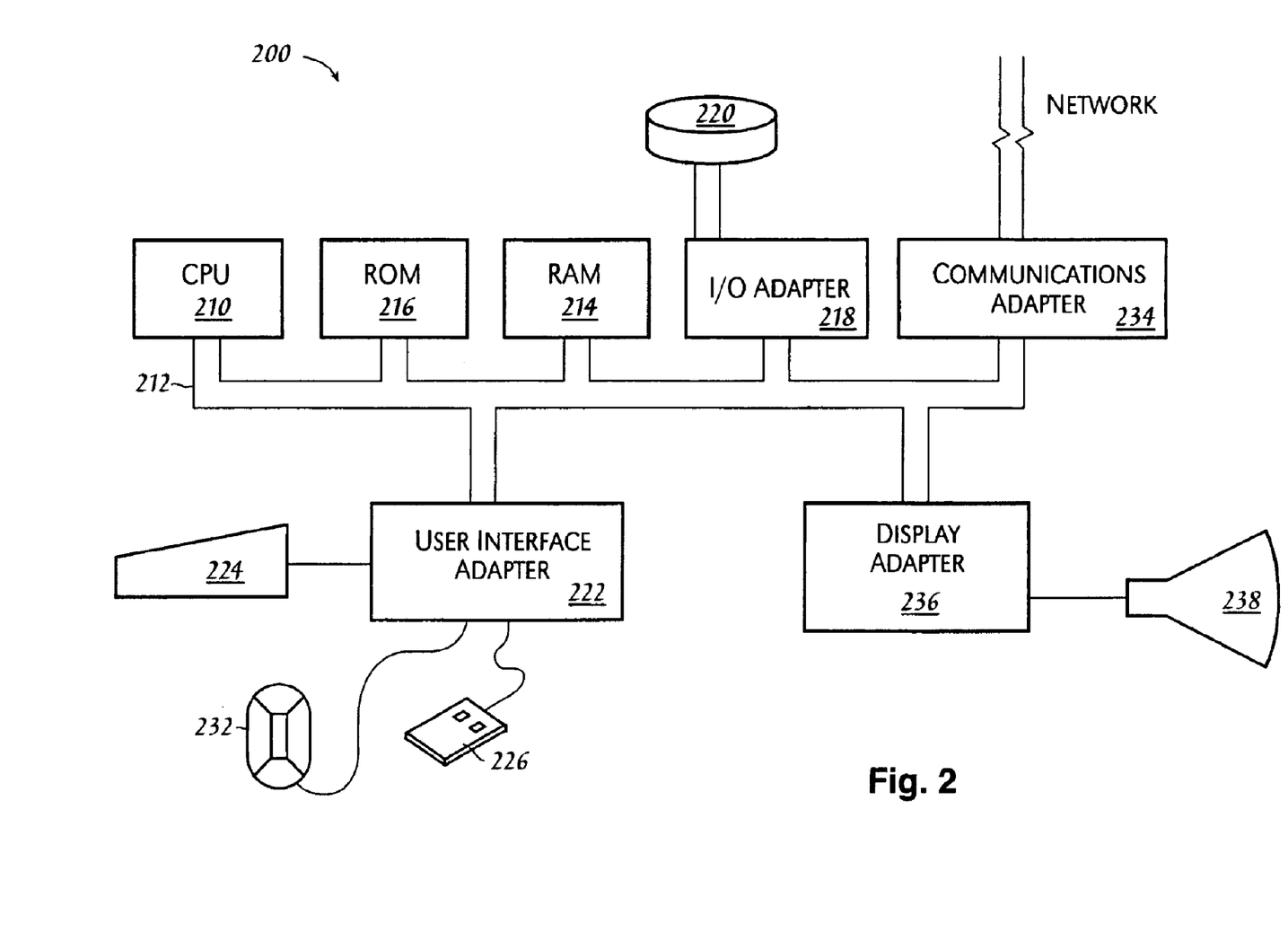
FIG. 2 illustrates, in block diagram form, a data processing system implemented in accordance with an embodiment of the present invention.

Referring first to FIG. 2, an example is shown of a data processing system 200 which may be used for the invention. The system has a central processing unit (CPU) 210, which is coupled to various other components by system bus 212. Read only memory ("ROM") 216 is coupled to the system bus 212 and includes a basic input/output system ("BIOS") that controls certain basic functions of the data processing system 200. Random access memory ("RAM") 214, I/O adapter 218, and communications adapter 234 are also coupled to the system bus 212. I/O adapter 218 may be a small computer system interface ("SCSI") adapter that communicates with a disk storage device 220. Communications adapter 234 interconnects bus 212 with an outside network enabling the data processing system to communicate with other such systems. Input/Output devices are also connected to system bus 212 via user interface adapter 222 and display adapter 236. Keyboard 224, track ball 232, mouse 226 and speakers 228 are all interconnected to bus 212 via user interface adapter 222. Display monitor 238 is connected to system bus 212 by display adapter 236. In this manner, a user is capable of inputting to the system throughout the keyboard 224, trackball 232 or mouse 226.

Preferred implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 3:
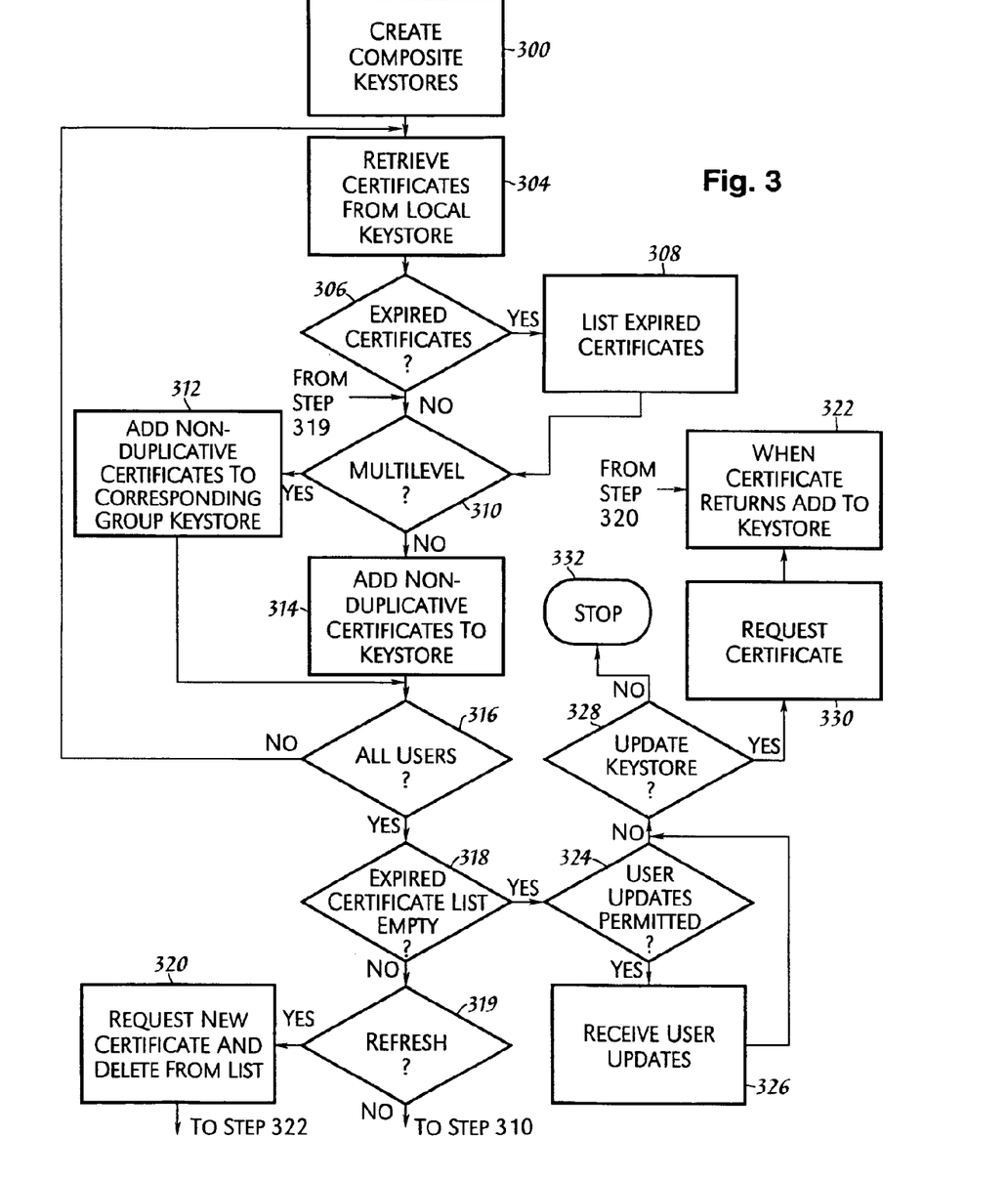
FIG. 3 illustrates, in flow chart form, a composite keystore methodology in accordance with an embodiment of the present invention.

Refer now to FIG. 3 illustrating, in flow chart form, methodology 300 for aggregating public, nonpersonal keystore information into a composite keystore, which may interchangeably be referred to as an aggregate keystore or distributed keystore. (The flow charts provided herein are not necessarily indicative of the serialization of the operations being performed in an embodiment of the present invention. Many of the steps disclosed in the flow charts may actually be performed in parallel. The flow chart is meant to designate those considerations that may be performed to produce the operation available on distributed keystores.) In an embodiment of the present invention, the composite key store may be created across an entire enterprise. Alternatively, a multi-level composite keystore may be implemented. A multi-level keystore (which may also be referred to as a hierarchical, or organizational keystore) aggregates certificates into keystore groups, which may be structured to parallel the organizational scheme of an enterprise, or other preselected keystore structure. In step 304, certificates are retrieved from the local keystores for users on the system Methodology 300 aggregates a keystore for each user by retrieving keystores on a user-by-user basis, as will be described in conjunction with steps 306–316.

Figure 4:
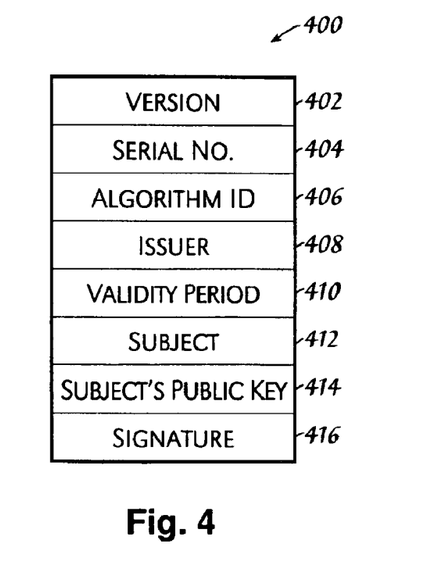
FIG. 4 schematically illustrates a key certificate which may be used in an embodiment of the present invention.

In step 306, it is determined if certificates retrieved from a users local keystore in step 304 are expired, or revoked. A certificate that has been compromised, for example, may be revoked by a CA. (Certificates that are expired or revoked may collectively be referred to as invalid certificates.) Referring to FIG. 4, there is schematically indicated therein the structure of a certificate 400 which may be used within the present invention. Certificate 400 may be a certificate in accordance with X.509 protocols. (X.509 refers to the international standard for digital certificates promulgated by the International Telecommunications Union—Telecommunications Standards Section (ITU-TSS).) Certificate 400 includes eight fields 402–416. Version field 402 identifies the certificate format. (For example, three versions of X.509 certificates have been specified.) Serial number field 404 contains a unique serial number assigned by the CA. Algorithm identifier field 406 identifies the algorithm used to sign the certificate. Field 406 may also include subfields containing any necessary parameters associated with the particular algorithm used to sign the certificate. (As previously discussed, digital signature algorithms are available in the data processing art, however, an artisan of ordinary skill would recognize that the particular digital signature algorithm used to sign a particular certificate is not germane to the present invention; the principles of the present invention are independent of the particular digital signal algorithm. Issuer field 408 includes the name of the CA issuing the certificate. Validity period field 410 includes a pair of dates delimiting the time period during which the certificate is valid. Subject field 412 includes the identity of the party whose public key is contained in the certificate, and which is being authenticated by the certificate. Public key field 414 includes the public key of the subject identified in field 412, along with additional information, such as the public key algorithm associated with the public key, and any necessary parameters required by the algorithm Signature field 416 includes the digital signature of the CA issuing the certificate, which issuer appears in field 408. Thus, in a certificate in accordance with the X.509 specifications, step 306 may be performed by examining the values in validity period field 410.

Returning to FIG. 3, if in step 306, expired or revoked certificates are found, the expired or revoked certificates are entered in a list thereof, in step 308. In step 310, it is determined if the certificates retrieved in step 304 are to be aggregated in a multi-level keystore. If so, the nonduplicative, unexpired unrevoked certificates are added to the corresponding keystore group in step 312. Otherwise, the nonduplicative, unexpired unrevoked certificates are added to the enterprise-wide keystore, step 314. Nonduplicative certificates refers to certificates retrieved in step 304 that do not otherwise exist in the keystore. Because certificates are aggregated over multiple users, and as previously discussed, certain applications (web browsers, for example) may install an embedded keystore of certificates included by the provider of the application software, each user having a local copy of such software may also replicate the common certificates. Such certificates, for example, need not be aggregated in multiple instances.

In step 316, it is determined if the local keystores of all users have been aggregated. If not, methodology 300 returns to step 304 to retrieve the certificates for a next user whose local keystores are to be incorporated in the aggregated keystore. If, in step 316, all user's local keystores have been aggregated, step 316 proceeds by the "Yes" branch and in step 318 it is determined if the expired/revoked certificate list, compiled in step 308 is empty. If the list is not empty, in step 319, it is determined if the expired/revoked certificates are to be refreshed. This may be set in accordance with a predetermined security policy. If so, in step 320, a new certificate request is sent to the issuer and the certificate deleted from the list generated in step 308. Recall that in a certificate in accordance with the X.509 specification, the CA issuing the certificate may be determined by examining the issuer field, field 408 in FIG. 4. When a requested certificate returns, it is added to the keystore, step 322. As would be understood by an artisan of ordinary skill, the return of a certificate from a CA may occur after an elapse of a relatively long period of time, on the order of a day.

Returning to step 318, if no expired/revoked certificates were found, the list of expired/revoked certificates is empty, and step 318 proceeds by the "Yes" branch. In step 324 it is determined if user updates are permitted. User updates may be permitted or denied in accordance with a predetermined policy. If, such a policy permits users to update certificates in the distributed keystore, then in step 326 user updates are received in step 326. Additionally, methodology 300 may automatically update the distributed keystore by, for example, tracking the expiration dates of certificates in the distributed keystore. Also, a distributed keystore may be updated by, for example, adding additional certificates in response to system administrator input. It would be understood by an artisan of ordinary skill that these events for updating the distributed keystore are exemplary, and that other events would be within the spirit and scope of the present invention. If, in step 328 the keystore is to be updated, in step 330 the certificate is requested, and methodology 300 proceeds to step 322. Otherwise, methodology 300 terminates step 332.

Figure 6:
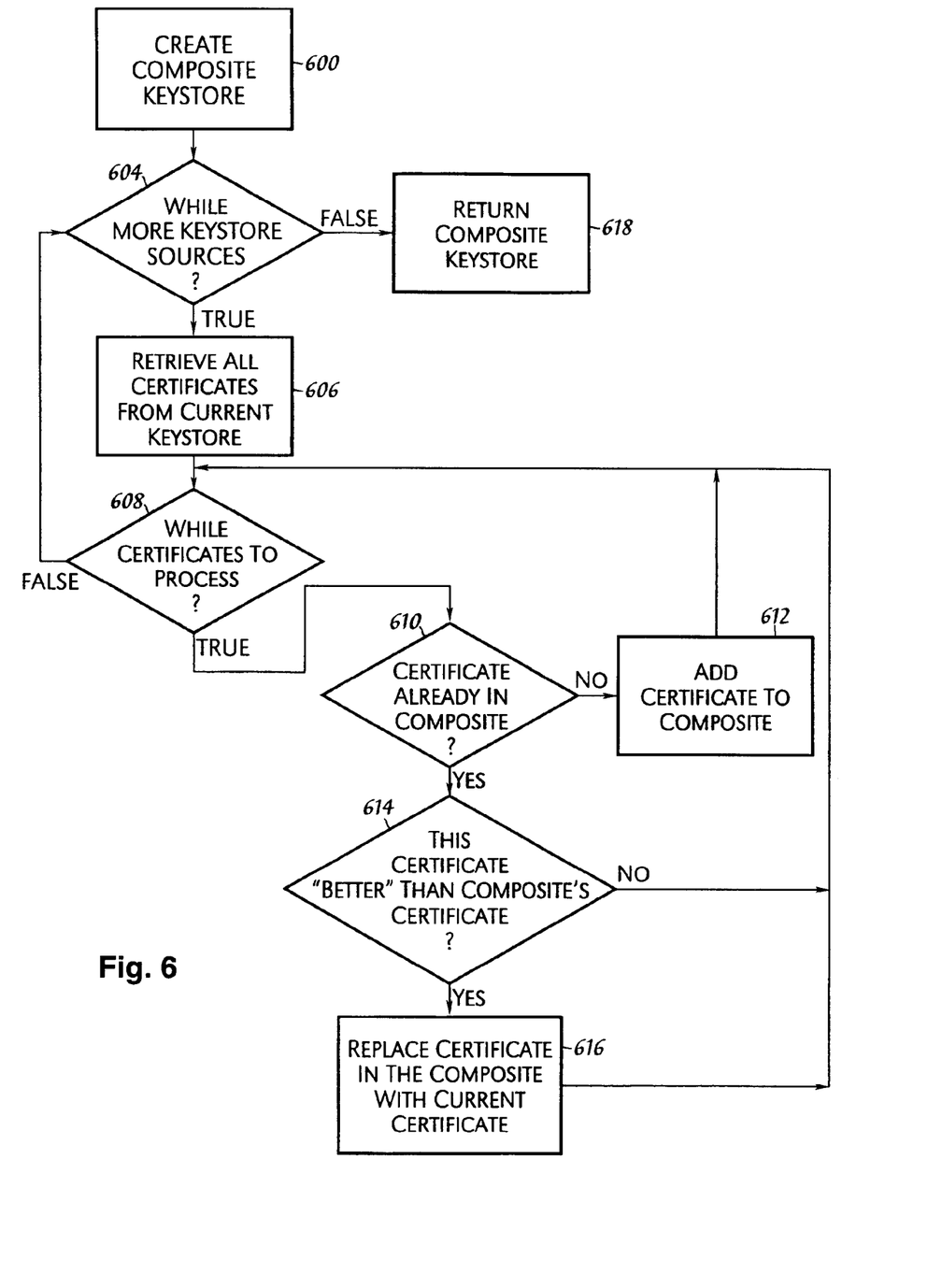
FIG. 6 illustrates, in flow chart form, a composite keystore methodology in accordance with an alternative embodiment of the present invention.

Refer now to FIG. 6 illustrating, in flow chart form, a methodology 600 for generating a composite keystore in accordance with an alternative embodiment of the present invention. Note that the composite keystore may be a logical object, and process 600 need not implicate the physical transfer of certificates. Process 600 composes the keystore in steps 604–616. While there are more keystore sources from which to populate the composite keystore, step 604 loops over steps 606–616. A keystore source may be represented by a location associated with a Uniform Resource Locator (URL), as discussed herein below. Each such keystore may be accessed for retrieving certificates using the URL. While there are more keystore sources, step 604, in step 606, all the certificates are retrieved from a current source. While, there are certificates to process from the current keystore source, step 608, it is determined in step 610 if a current certificate is already in the composite keystore. If not, the certificate is added to the composite, step 612, and methodology 600 returns to step 608.

If, the certificate already exists in the composite keystore, in step 614 it is determined if the certificate being processed is "better" then the corresponding certificate in the composite certificate. A keystore may be "better" in accordance with a set of predetermined criteria. If the certificate being processed is unexpired while the preexisting corresponding certificate in the keystore is expired, or if the certificate being processed is unrevoked while the corresponding certificate in the composite keystore is revoked, or in accordance with a predetermined policy-based decision. An exemplary policy-based decision may determine that a version of the certificate being processed that is higher in the composite hierarchy is "better", or alternatively, "worse", as a matter of a predetermined security policy. It would be understood by an artisan of ordinary skill that the aforementioned criteria are exemplary, and not exalts to, and, moreover, the criteria correspond to Boolean logical expressions which may be implemented to perform the decision in step 614. If, in step 614 the certificate being processed is "better" the current certificate may be said to supercede a certificate in the composite keystore and in step 616 the preexisting certificate in the composite is replaced with the current certificate, and process 600 returns to step 608. Otherwise, if, in step 614 it is determined that current certificate is not "better" then the composite, step 614 proceeds by the "No" branch to step 608.

Returning to step 604, after all keystore sources have been looped over, step 604 proceeds by the "False" branch, and in step 618, the keystore object is returned. Security class methods may be called to access the composite keystore object.

Figure 5:
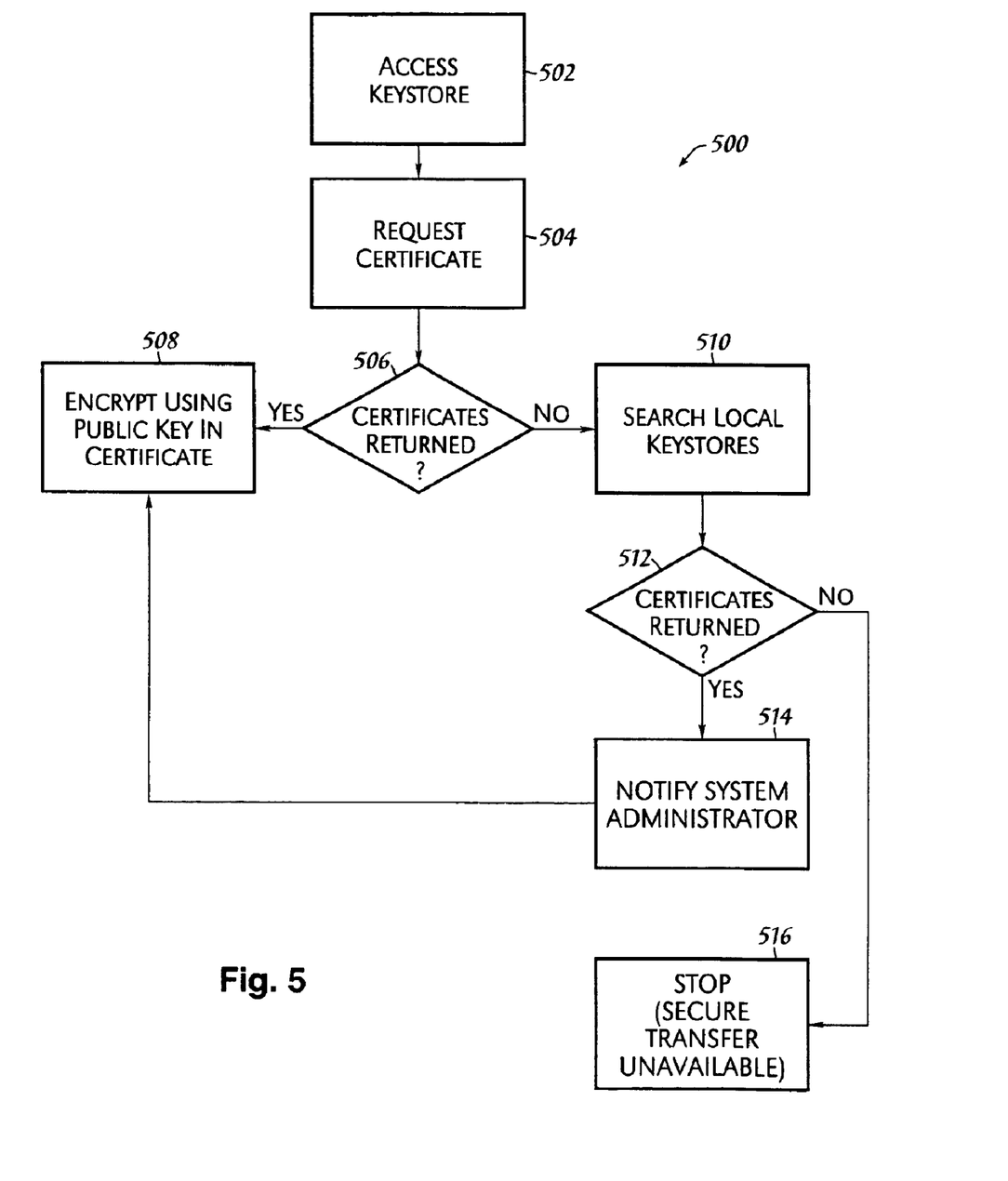
FIG. 5 illustrates, in flow chart form, a data transfer methodology in accordance with another embodiment of the present invention.

Refer now to FIG. 5 illustrating, in flow chart form, methodology 500 for secured data transfer using a distributed keystore in accordance with the principles of the present invention. In step 502, the distributed keystore is accessed. Access may be provided, via a plurality of protocols. For example, a connection to the keystore and certificate requests communicated in accordance with the file transport protocol (FTP), hypertext transfer protocol (HTTP) and the Secure Sockets Layer (SSL) extension thereof (HTTPs), or via a directory protocol such as the lightweight directory access protocol (LDAP). (These protocols have been standardized for use on the Internet, the specifications for which are published in corresponding Requests for Comments (RFC): RFC 414 (FTP), RFC 2616 (HTTP) and RFC 2251 (LDAP).) Additionally, conventional file access using a path name statement may also be provided in an embodiment in accordance with the principles of the present invention. Likewise, the keystore may be identified by a similarly formatted string identifying the keystore's location and the protocol for delivery of the certificates, commonly referred to as a Uniform Resource Locator (URL). (URLs are formatted in accordance with the syntax specified in RFC 1738. The portion of a URL specifying the access and transfer protocol, such as HTTP, and followed by ":", is referred to as the scheme specifier, and conventional file access, as previously described, may be effected by specifying "file" as the scheme in accordance with the URL syntax specification.)

The URLs for a keystore in accordance with the principles of the present invention may, for example in an embodiment implemented in a Java™ environment, be an instance of the Java™ KeyStore class. The distributed keystore may be specified by associating the name of the keystore with an instance of the keystore type. Properties may be associated with the keystore, which properties may be contained in a java.security class file. Instances of Java™ Properties objects may be associated with each URL which may be used to establish a connection to the keystore. An application requiring a certificate may retrieve a URL for the keystore by invoking the getProperty method of the java.security class. Step 502 may then be performed by establishing a connection to the keystore in accordance with the transport protocol associated with the scheme specified in the retrieved URL.

In step 504, a certificate including the public key needed to send the secure message is requested. The request may be formatted in accordance with the transport protocol specified in the scheme of the URL for the keystore, which URL may have been retrieved as previously described. Although the steps 502 and 504 have been discussed in the context of a Java environment, an artisan of ordinary skill would recognize that the principles of the present invention may be embodied in other environments, and such embodiments would be within the spirit and scope of the present invention.

In step 506, it is determined if this requested certificate is returned. If a requested certificate is returned, then the requesting application encrypts the data to be transferred using the public key in the certificate, step 508. The encryption methodology may be in accordance with the encryption algorithm specified in the public key field 414, FIG. 4. If however, the requested certificate is not in the distributed keystore, step 506 proceeds by the "No" branch, and the user's local keystore is searched, step 510. If, the certificate is in the local keystore, step 512, then in step 514 the system administrator is notified to update the distributed keystore since the user's local keystore and the distributed keystore are out of synchronization. The data to be transferred may then be encrypted using the recipient's public key obtained from the certificate retrieved from the user's local keystore, step 508. If, however, in step 512 the requested certificate is not in the user's local keystore, then a secure transfer is unavailable, and the user notified, step 516.

Although the present invention and its advantages have been described in detail, it should be understood that various changes, substitutions and alterations can be made herein without departing from the spirit and scope of the invention as defined by the appended claims.

What is claimed is:

1. A method of managing a composite keystore generated from user local keystores comprising the steps of:

retrieving one or more certificates from a local database of a user, wherein the certificates are associated with the user;

responsive to retrieving said one or more certificates, determining if any of said one or more certificates preexists in a preselected portion of a distributed database of the composite keystore; and storing nonpreexisting certificates of said one or more certificates in said preselected portion of said distributed database.

2. The method of claim 1 wherein said preselected portion of said distributed database comprises said distributed database.

3. The method of claim 1 further comprising, responsive to determining that said one or more certificates do not preexist in the preselected portion of the distributed database, determining if said one or more certificates is invalid.

4. The method of claim 3 wherein said step of storing nonpreexisting certificates of said one or more certificates is bypassed for invalid certificates.

5. The method of claim 3 further comprising the step of requesting, by the composite keystore, a new certificate corresponding to an invalid certificate, wherein the new certificate is valid and corresponds to the invalid certificate.

6. The method of claim 1 further comprising the step of updating said distributed database in response to an update event.

7. The method of claim 6 wherein said step of updating said distributed database comprises the steps of:

requesting one or more new certificates by the composite keystore; and adding said new certificates to said distributed database.

8. The method of claim 1 further comprising the steps of:

responsive to determining any of said one or more certificates preexists, determining if a current certificate supercedes a preexisting certificate; and responsive to determining the current certificate supercedes the preexisting certificate, replacing said preexisting certificate with said current certificate if said current certificate supercedes said preexisting certificate.

9. The method of claim 1 further comprising the steps of:

accessing said distributed database; and responsive to accessing said distributed database, requesting a selected certificate from said distributed database, wherein the selected certificate is used for encrypting data to be transferred in a secured data transfer.

10. The method of claim 9 further comprising the step of searching the local database for said selected certificate in response to a failure of said step of requesting said selected certificate.

11. The method of claim 1 further comprising the step of repeating, for a second local database, the steps of:

retrieving one or more certificates from the second local database of a second user;

determining if any of said one or more certificates retrieved from the second local database preexists in a second preselected portion of the distributed database; and storing nonpreexisting certificates of said one or more certificates from the second local database in said second preselected portion of said distributed database.

12. The method of claim 8 wherein said distributed database comprises a logical keystore.

13. A computer program product embodied in a tangible storage medium, the program product for managing a composite keystore generated from user local keystores, the program product including a program of instructions for performing the steps of:

retrieving one or more certificates from a first local database of a user, wherein the certificates are associated with the user;

responsive to retrieving said one or more certificates, determining if any of said one or more certificates preexists in a preselected portion of a distributed database of the composite keystore; and storing nonpreexisting certificates of said one or more certificates in said preselected portion of said distributed database.

14. The program product of claim 13 wherein said preselected portion of said distributed database comprises said distributed database.

15. The program product of claim 13 wherein said program of instructions further comprises programming for performing, responsive to determining that said one or more certificates do not preexist in the preselected portion of the distributed database, the step of determining if said one or more certificates is invalid.

16. The program product of claim 15 wherein said step of storing nonpreexisting certificates of said one or more certificates is bypassed for invalid certificates.

17. The program product of claim 15 wherein said program of instructions further comprises programming for performing the step of requesting, by the composite keystore, a new certificate corresponding to an invalid certificate, wherein the new certificates is valid and corresponds to the invalid certificate.

18. The program product of claim 13 wherein said program of instructions further comprises programming for performing the step of updating said distributed database in response to an update event.

19. The program product of claim 18 wherein said step of updating said distributed database comprises the steps of:

requesting one or more new certificates by the composite keystore; and adding said new certificates to said distributed database.

20. The program product of claim 13 wherein said program of instructions further comprises programming for performing the steps of:

responsive to determining any of said one or more certificates preexists, determining if a current certificate supercedes a preexisting certificate; and responsive to determining the current certificate supercedes the preexisting certificate, replacing said preexisting certificate with said current certificate if said current certificate supercedes said preexisting certificate.

21. The program product of claim 13 wherein said program of instructions further comprises programming for performing the steps of:

accessing said distributed database; and responsive to accessing said distributed database, requesting a selected certificate from said distributed database, wherein the selected certificate is used for encrypting data to be transferred in a secured data transfer.

22. The program product of claim 21 wherein said program of instructions further comprises programming for performing the step of searching the local database for said selected certificate in response to a failure of said step of requesting said selected certificate.

23. The computer program product of claim 13 wherein said program of instructions further comprises instructions for the step of repeating, for a second local database, the steps of:

retrieving one or more certificates from the second local database;

determining if any of said one or more certificates from the second local database preexists in a second preselected portion of the distributed database; and storing nonpreexisting certificates of said one or more certificates from the second local database in said second preselected portion of said distributed database.

24. The computer program product of claim 20 wherein said distributed database comprises a logical keystore.

25. A data processing system for managing a composite keystore generated from user local keystores comprising:

circuitry operable for retrieving one or more certificates from a first local database of a user, wherein the certificates are associated with the user;

circuitry operable for determining, responsive to retrieving said one or more certificates, if any of said one or more certificates preexists in a preselected portion of a distributed database of the composite keystore; and circuitry operable for storing nonpreexisting certificates of said one or more certificates in said preselected portion of said distributed database.

26. The system of claim 25 wherein said preselected portion of said distributed database comprises said distributed database.

27. The system of claim 25 further comprising circuitry operable for, responsive to determining that said one or more certificates do not preexist in the preselected portion of the distributed database, determining if said one or more certificates is invalid.

28. The system of claim 27 wherein said circuitry operable for determining if said one or more certificates is invalid includes circuitry operable for bypassing, for invalid certificates, said circuitry operable for storing nonpreexisting certificates.

29. The system of claim 27 further comprising circuitry operable for requesting, by the composite keystore, a new certificate corresponding to an invalid certificate.

30. The system of claim 25 further comprising circuitry operable for updating said distributed database in response to an update event.

31. The system of claim 30 wherein said circuitry operable for updating said distributed database comprises:

circuitry operable for requesting one or ore new certificates by the composite keystore; and circuitry operable for adding said new certificates to said distributed database.

32. The system of claim 25 further comprising:

circuitry operable for, responsive to determining any of said one or more certificates preexists, determining if a current certificate supercedes a preexisting certificate; and circuitry operable for replacing, responsive to determining the current certificate supercedes the preexisting certificate, said preexisting certificate with said current certificate if said current certificate supercedes said preexisting certificate.

33. The system of claim 25 further comprising:

circuitry operable for accessing said distributed database; and circuitry operable for requesting, responsive to accessing said distributed database, a selected certificate from said distributed database, wherein the selected certificate is used for encrypting data to be transferred in a secured data transfer.

34. The system of claim 33 further comprising circuitry operable for searching the local database for said selected certificate in response to a failure of said step of requesting said selected certificate.

35. The system of claim 25 further comprising circuitry operable for repeating, for a second local database of a second user, the steps of:

retrieving one ore more certificates from the second local database;

determining if any of said one or more certificates of the second local database preexists in a second preselected portion of the distributed database; and storing nonpreexisting certificates of said one or more certificates from the second local database in said second preselected portion of said distributed database.

36. The system of claim 32 wherein said distributed database comprises a logical keystore.

* * * * *